(12) United States Patent
Oved

(10) Patent No.: US 8,205,793 B2
(45) Date of Patent: Jun. 26, 2012

(54) BANKING TRANSACTION PROCESSING SYSTEM

(76) Inventor: Dror Oved, Burlington, MA (US)

( * ) Notice: Subject to any disclaimer, the term of this patent is extended or adjusted under 35 U.S.C. 154(b) by 1021 days.

(21) Appl. No.: 12/080,089

(22) Filed: Mar. 31, 2008

(65) Prior Publication Data

US 2008/0257959 A1 Oct. 23, 2008

Related U.S. Application Data

(60) Provisional application No. 60/909,453, filed on Mar. 31, 2007, provisional application No. 60/913,995, filed on Apr. 25, 2007.

(51) Int. Cl.
*G06Q 40/00* (2006.01)
*G06Q 20/00* (2006.01)
*G06F 7/08* (2006.01)
*G06F 17/00* (2006.01)
*G07F 19/00* (2006.01)
*G06K 5/00* (2006.01)
*G06K 7/00* (2006.01)
*G06K 19/00* (2006.01)
*G07D 11/00* (2006.01)

(52) U.S. Cl. ........ 235/380; 235/379; 235/381; 235/375; 235/435; 235/487; 705/64; 705/65; 705/67; 705/75

(58) Field of Classification Search .......... 235/379–381, 235/435, 449–440, 487, 492–493; 705/64, 705/65, 67, 72, 75, 77, 39, 44
See application file for complete search history.

(56) References Cited

U.S. PATENT DOCUMENTS

| | | | | | |
|---|---|---|---|---|---|
| 4,882,473 | A | * | 11/1989 | Bergeron et al. | 463/25 |
| 5,745,554 | A | * | 4/1998 | Rozetti | 379/91.02 |
| 5,936,221 | A | * | 8/1999 | Corder et al. | 235/380 |
| 6,394,343 | B1 | * | 5/2002 | Berg et al. | 235/379 |
| 7,267,268 | B2 | * | 9/2007 | Sia | 235/380 |
| 7,424,732 | B2 | * | 9/2008 | Matsumoto et al. | 726/2 |
| 7,766,226 | B2 | * | 8/2010 | Sia | 235/380 |
| 7,841,518 | B2 | * | 11/2010 | Sia | 235/380 |
| 7,841,539 | B2 | * | 11/2010 | Hewton | 235/492 |
| 7,861,924 | B1 | * | 1/2011 | Block et al. | 235/379 |
| 2002/0046186 | A1 | * | 4/2002 | Nishio et al. | 705/65 |
| 2003/0101137 | A1 | * | 5/2003 | Wronski, Jr. | 705/44 |
| 2003/0144952 | A1 | * | 7/2003 | Brown et al. | 705/40 |
| 2003/0163426 | A1 | * | 8/2003 | Zhang et al. | 705/43 |
| 2003/0191945 | A1 | * | 10/2003 | Keech | 713/182 |
| 2004/0099746 | A1 | * | 5/2004 | Norton | 235/492 |
| 2005/0108096 | A1 | * | 5/2005 | Burger et al. | 705/14 |
| 2005/0167491 | A1 | * | 8/2005 | Sia | 235/382 |
| 2005/0269401 | A1 | * | 12/2005 | Spitzer et al. | 235/380 |
| 2007/0033149 | A1 | * | 2/2007 | Kanngard et al. | 705/65 |
| 2007/0055630 | A1 | * | 3/2007 | Gauthier et al. | 705/44 |
| 2008/0203151 | A1 | * | 8/2008 | Dixon et al. | 235/380 |
| 2009/0134216 | A1 | * | 5/2009 | Boettiger | 235/380 |
| 2009/0212106 | A1 | * | 8/2009 | Sia | 235/380 |
| 2009/0255987 | A1 | * | 10/2009 | Olivares Baena | 235/380 |
| 2009/0277960 | A1 | * | 11/2009 | Sia | 235/380 |

(Continued)

*Primary Examiner* — Daniel Walsh
(74) *Attorney, Agent, or Firm* — Kristofer E. Elbing

(57) ABSTRACT

Banking transaction processing apparatus and methods are disclosed. In one general aspect, a banking transaction processing method includes accessing a first authorization code from a first device, such as a credit card, and a second authorization code from a second device, such as a portable phone, at a merchant location, These codes are provided to an authorization module at the merchant location, and a relationship between the first and second authorization codes is evaluated. A transaction authorization indication can then be provided from the authorization module for an in-person transaction with the merchant.

31 Claims, 4 Drawing Sheets

Process of Paying

U.S. PATENT DOCUMENTS

| | | |
|---|---|---|
| 2010/0059587 A1* | 3/2010 | Miller et al. .................. 235/379 |
| 2010/0088228 A1* | 4/2010 | Febonio et al. ................ 705/41 |
| 2010/0241564 A1* | 9/2010 | Miller et al. ................... 705/43 |
| 2010/0277320 A1* | 11/2010 | Gold .......................... 340/572.1 |
| 2010/0325046 A1* | 12/2010 | Milne ............................ 705/44 |
| 2010/0327055 A1* | 12/2010 | Sia ................................ 235/379 |

* cited by examiner

BANKING TRANSACTION PROCESSING SYSTEM

CROSS-REFERENCE TO RELATED APPLICATION

This application claims the benefit under 35 U.S.C. 119(e) of U.S. provisional application No. 60/909,453 filed Mar. 31, 2007 and U.S. provisional application No. 60/913,995 filed Apr. 25, 2007, which are both herein incorporated by reference.

FIELD OF THE INVENTION

This application relates to improvements in security for banking transactions, such as credit card transactions.

BACKGROUND OF THE INVENTION

Numerous fraudulent credit card transactions have occurred as result of on-line, in-store and over-the-phone security breaches. Causes of security breaches include user negligence, such as credit card loss or poor disposal of documents, as well as merchant negligence, such as leaving databases vulnerable to hackers or loss of portable computers. Overall, the credit card industry spends millions of dollars a year because of fraudulent transactions.

Banks and the credit card industry have invested large amounts of money to develop software that analyzes cardholder buying habits to detect unusual card transactions. Some of these detections are inaccurate, however, and can cause inconvenience. They may also only detect a fraudulent transaction after it has been completed, and may therefore only prevent a possible second attempt.

For these and other reasons, improvements in transaction security could be of great benefit to financial institutions, such as credit card issuers, and their customers.

SUMMARY OF THE INVENTION

In one general aspect, the invention features a banking transaction processing method includes accessing a first authorization code from a first device, such as a credit card, and a second authorization code from a second device, such as a portable phone, at a merchant location, These codes are provided to an authorization module at the merchant location, and a relationship between the first and second authorization codes is evaluated. A transaction authorization indication can then be provided from the authorization module for an in-person transaction with the merchant.

In preferred embodiments the first device can be a payment card, with the second device being a portable electronic device, with the steps of accessing and providing a first authorization code being performed by interaction with a magnetic recording area on the payment card and with the step of accessing a second stored authorization code being performed by accessing a first of a series of transaction-specific validation code sequences from the portable electronic device. The method can further include the steps of providing a version of the first stored authorization code to a further transaction authorization module for a further merchant, and providing a version of a second of the series of transaction-specific validation code sequences to the further transaction authorization module for the further merchant. The step of providing a version of the first stored authorization code to the further transaction authorization module and the step of providing a version of the second stored authorization code to the further transaction authorization module can be performed through a communication channel such as a telephonic voice line or a public computer network. The method can further include the steps of providing a version of the first stored authorization code to a further transaction authorization module for a further merchant through a communication channel, and providing a version of the second stored authorization code to the further transaction authorization module through a communication channel for the further merchant. The step of accessing a second authorization code can access an alphanumerical code that is equal to or less than about seven characters in length. The step of accessing a second authorization code can access an alphanumerical code that is equal to or less than about four characters in length. The method can further include a step of generating the second authorization code locally in a portable electronic device. The method can further include a step of providing generation logic that performs the local authorization code generation to the portable device through a communication channel. The method can further include a step of transmitting the second authorization code to a portable electronic device before the step of accessing the second authorization code. The step of evaluating can evaluate whether the second authorization code corresponds to a specific stored transaction-specific validation code sequence for a particular transaction conducted in connection with the first authorization code. The steps of providing a first authorization code and providing a second authorization code can both be performed independently of any user data entry. The step of providing a second authorization code can be performed with a keypad or keyboard. The step of accessing a second stored authorization code can be performed by accessing a first of a series of transaction-specific validation code sequences from a portable electronic device. The method can further include the steps of reissuing the first authorization code and reinitializing the series of transaction-specific validation code sequences. The steps of accessing and providing a first authorization code can be performed by accessing a magnetically stored account number on a credit card using a unitary retailer-based authorization module, with the step of accessing a second stored authorization code being performed by accessing a first of a series of transaction-specific validation code sequences of about seven alphanumeric characters or less from a portable electronic device and the step of providing the second authorization code being performed using a keypad on the unitary retailer-based authorization module, and with the method further including the steps of providing a version of the first stored authorization code to a further transaction authorization module via a telephonic voice line, and providing a version of second of the series of transaction-specific validation code sequences to the further transaction authorization module via a telephonic voice line.

In another general aspect, the invention features a banking transaction processing system that includes a first device including storage that holds a first, static authorization code, and a second device including storage that holds a second, transaction-specific authorization code. The first authorization code is stored in the first device and the second authorization code stored in the second device form part of a predetermined authorization code pair.

In preferred embodiments the system can further include a first machine-accessible interface responsive to the static authorization code stored in the first device and a second machine-accessible interface responsive to the transaction-specific authorization code stored in the second device. The first device can be a payment card that includes a machinereadable magnetic storage area, and wherein the second device is a portable electronic device.

In a further general aspect, the invention features a banking transaction processing system that includes an authorization code pair receipt interface operative to receive a first authorization code and a second authorization code, evaluation logic operative to determine whether the second authorization code correctly matches a member of a series of predetermined transaction-specific code sequences each corresponding to a particular transaction for the first authorization code, and an authorization indication output responsive to the evaluation logic and operative to communicate a transaction approval signal.

In preferred embodiments the receipt interface can include a magnetic reading interface portion of a retailer-based authorization terminal for receiving the first authorization code and a short-range wireless interface portion of the retailer-based authorization terminal for receiving the second authorization code, with the evaluation logic being operative to receive a remotely generated transaction approval signal from a processing center and relay it to the authorization indication output. The receipt interface can include a processing center-based telephonic interface operative to receive the first and second authorization codes and operative to reply with a corresponding transaction approval signal. The receipt interface can include a public computer network interface operative to receive the first and second authorization codes. The system can further include an electronic authorization setup transfer interface operative to transfer second authorization code information to a portable electronic device. The electronic authorization setup transfer interface can be operative to transfer program logic that is operative in connection with the portable device to generate the second authorization code.

In another general aspect, the invention features a banking transaction processing method that includes providing a first static code to a merchant at a merchant location and providing a first of a series of transaction-specific authorization code sequences from a portable electronic device to the merchant at the merchant location, to validate an in-person transaction, providing the first static code to a telephone merchant through a telephonic voice line and providing a second of the series of transaction-specific authorization code sequences from a portable electronic device to the telephone merchant through the telephonic voice line to validate a telephone transaction, and providing the first static code to an on-line merchant through a public computer network and providing a third of the series of transaction of transaction-specific authorization code sequences from a portable electronic device to the on-line merchant through the public computer network to validate an on-line transaction. In preferred embodiments the method further includes the step of storing the series in the portable device before the in-person transaction, before the telephone transaction, and before the on-line telephone transaction.

In a further general aspect, the invention features a banking transaction processing method that includes accessing a first stored authorization code from a first device independently of any communication of transaction-time authorization code information to the first device, accessing a second stored authorization code from a second device independently of any communication of transaction-time authorization code information to the second device, providing the first authorization code to an authorization module, providing the second authorization code to the authorization module, evaluating a relationship between the first and second authorization codes, and providing a transaction authorization indication from the authorization module based on a result of the step of evaluating.

In another general aspect, the invention features a banking transaction processing method that includes accessing a first stored authorization code independent of any transaction-specific password access, accessing a second stored authorization code independent of any transaction-specific password access, providing the first authorization code to an authorization module, providing the second authorization code to the authorization module, evaluating a relationship between the first and second authorization codes, and providing a transaction authorization indication from the authorization module based on a result of the step of evaluating, independent of any user-entered remembered password Unlike many prior art transaction security systems, systems according to the invention can be used with a variety of different types of transactions, including in-person, telephone, and internet purchases. Systems according to the invention can also be easily adapted to the existing technological infrastructure. In today's culture, carrying a cell-phone, media player, PDA, and other electronic devices is very common among all income levels, geographic locations, and age brackets. Young adults carry cell phones and media players, business people carry sophisticated PDAs and cell phones, and even senior citizens carry cell phones. These electronic devices are generally powerful and can be modified to include additional software and/or hardware tools that can safely and repeatedly be part of banking and credit card transactions. Systems according to the invention can also be used in connection with existing Personal Identification Number (PIN) keypads.

DESCRIPTION OF AN ILLUSTRATIVE EMBODIMENT

The illustrative embodiment of the invention presented below can provide a method of increasing security levels for banking transactions, such as credit card transactions, by adding a second device that can be required to complete a transaction authentication request. This second device includes a dynamic code mechanism that provides a security code that is a required part of the authentication request.

Figure 1:
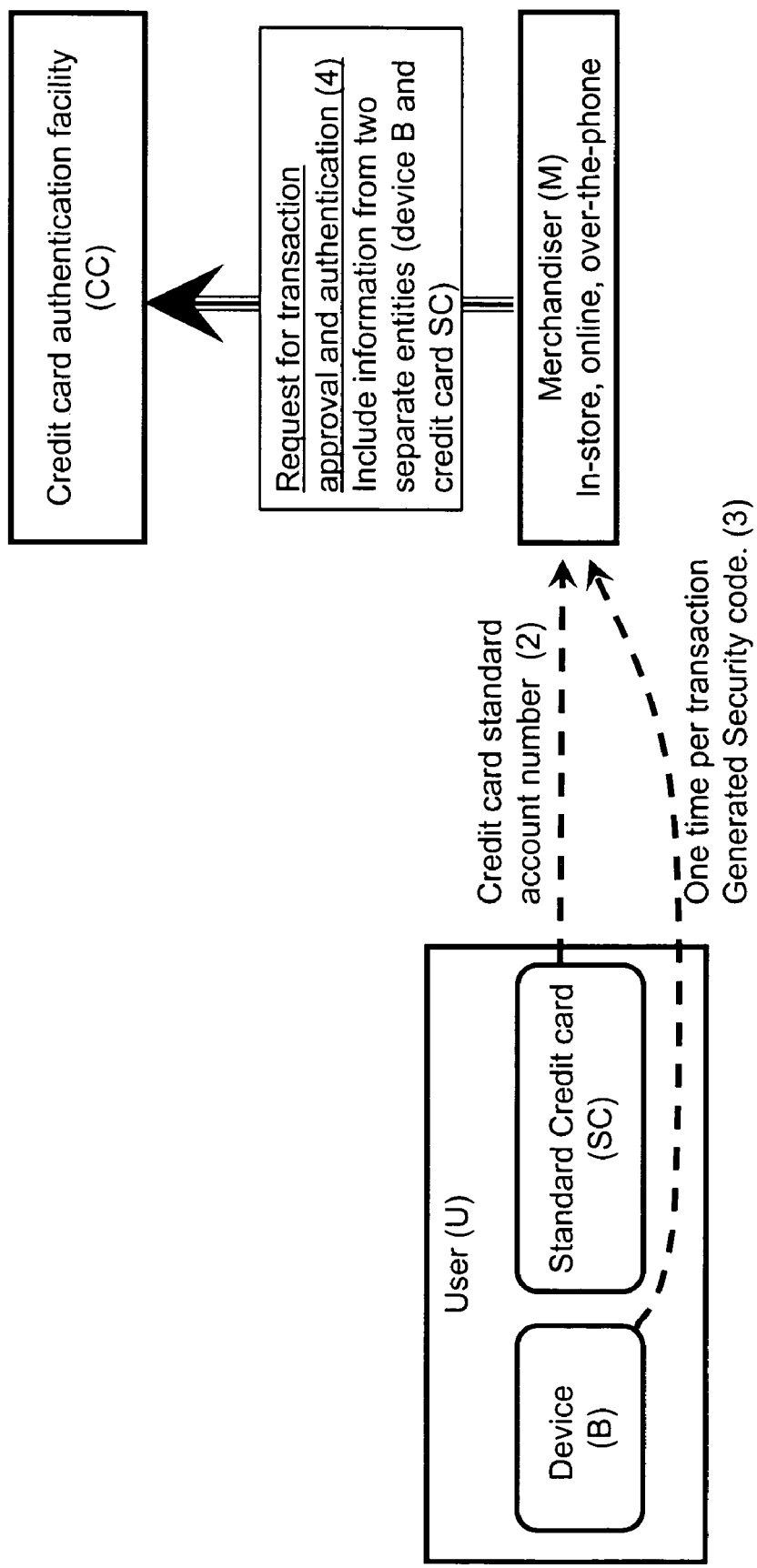
FIG. 1 is a block diagram showing an illustrative payment transaction according to the invention.

Referring to FIG. 1, there is shown schematically the general operation of a method according to the illustrative embodiment for an in-store credit card transaction. The same outline applies generally to over-the-phone and on-line transactions.

To complete a purchase, the user (U) provides credit card (SC) information to the merchant (M). This information includes standard credit card information, such as account number, expiration date, and/or name.

The user (U) also generates a unique code for the transaction by activating a code generation module that resides on the user handheld device (B). In this example, the device is a personal cell-phone, although other types of portable devices could also be used. The generated code is then given to the merchant (M), who includes it in his or her request for transaction approval and authentication (4) to the credit card authentication facility/server (CC). The code can be communicated to the merchant in a variety of ways, such as orally, in writing, by short-range wireless communication (e.g., Bluetooth), long-range wireless communication (e.g., GSM), or by cardholder input to a keypad. The account information can also be communicated to the user in a variety of ways, such as orally, in writing, by swiping a magnetic stripe of a credit card, or through radio waves (e.g., RFID).

Figure 2:
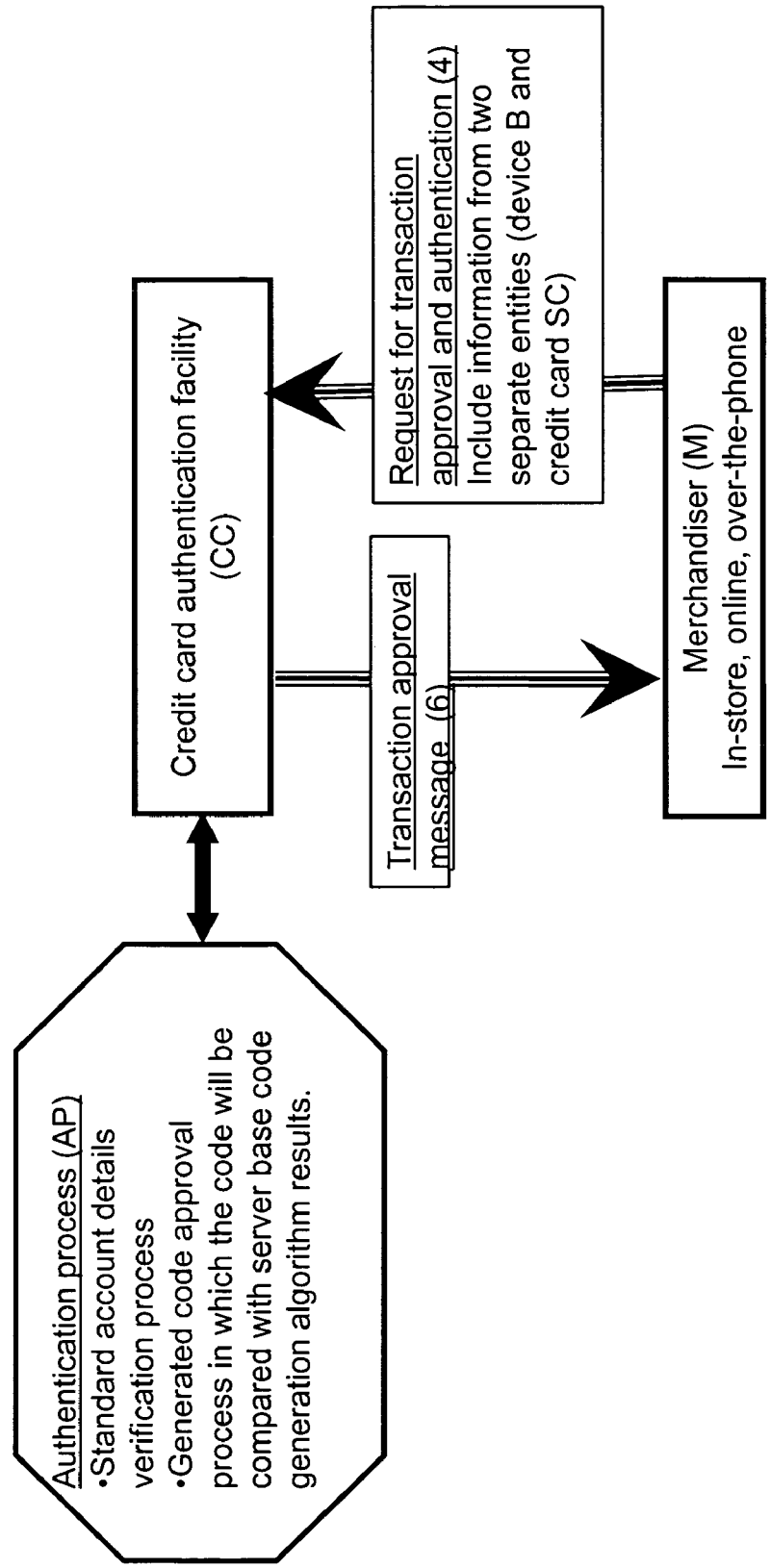
FIG. 2 is a block diagram showing an illustrative transaction approval method according to the invention.

Referring to FIG. 2, there is shown schematically the general operation of a method according to the illustrative embodiment for the approval process by a credit card authentication facility (CC). The Merchant (M) and/or the user (U) can begin by manually entering the code (3), which is displayed on the device (B), such as by typing the code on a touchpad of an authorization terminal, before transmitting a request for approval and authentication (4) by the merchant (M). The system can also perform an automatic and/or wireless transmission of the code (3) to the merchant (M). For example, in a in-store transaction, the user (U) can "wave" the device (B) close to a merchant terminal to transmit the code (3) directly, such as through the use of a radio frequency or infrared communication protocol.

As discussed above, the approval process can use the same types of channels that are used in existing transactions. For example, a dedicated keypad-based approval terminal can communicate over a telephone line with a central authorization authority. The system can also support a variety of other authorization channels, such as oral telephone requests for authorization or web-based requests.

Figure 3:
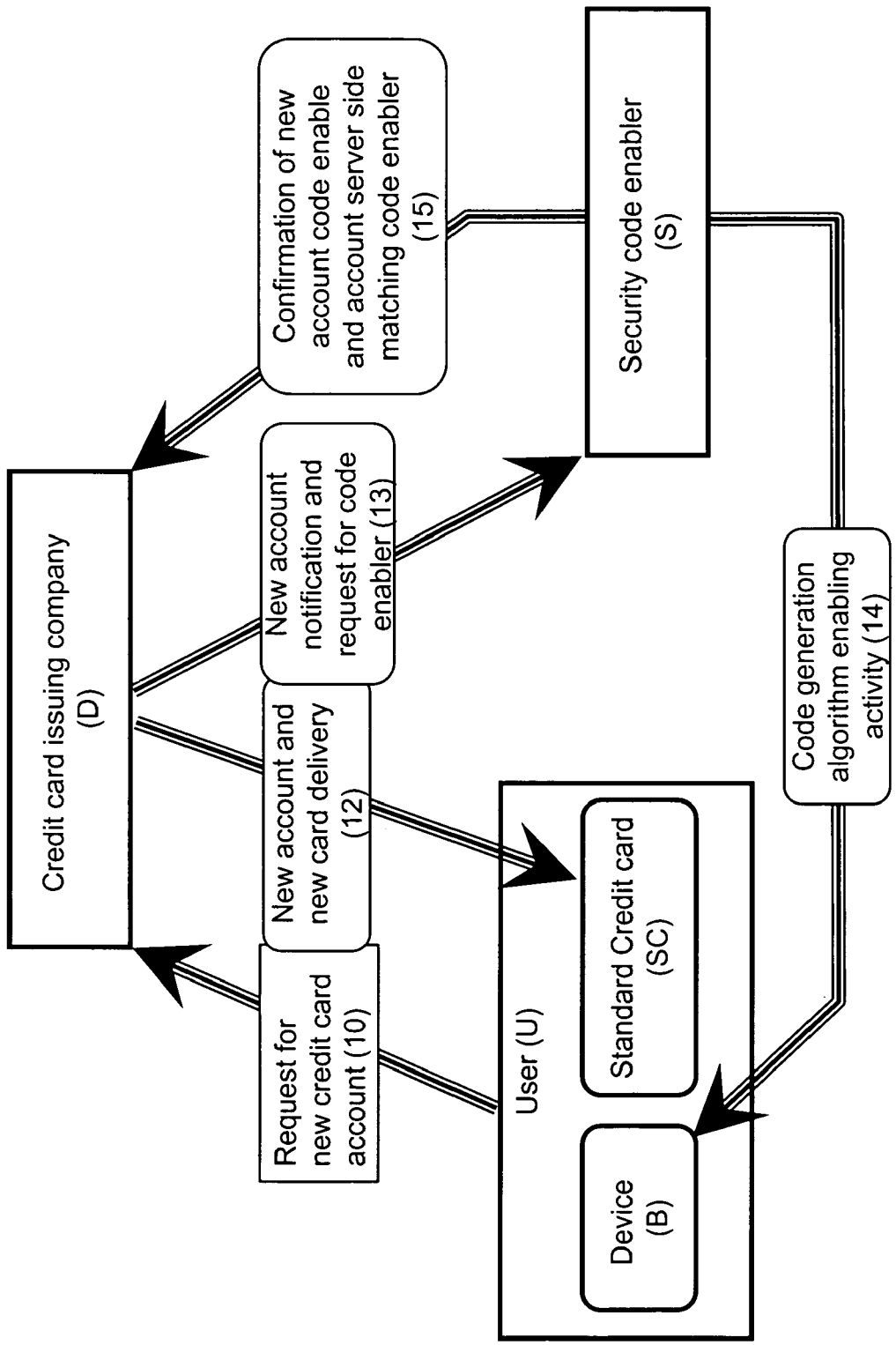
FIG. 3 is a block diagram showing an illustrative new card issuance method according to the invention.

Referring to FIG. 3, there is shown schematically the general operation of a setup method according to the illustrative embodiment. During a request for new or re-initialized account (10), the user (U) provides his or her usual identifying information, such as SSN, name, and address. This request information (10) can include details about the user's chosen device (B), such as manufacturer, model, and cell phone number.

After any required approval process, such as a credit check, the issuing company (D) sends a new card and account number (12) to the user (U), and requests code activation (13) from a security code enabler (S). The security code enabler (S) initializes or re-initializes a code generation module in the device (B) via different means such as web access, wireless, text messaging, phone or manual activity. This module can include software that implements any suitable code generation algorithm to generate the sequence of codes on the portable device and store them at least ephemerally for display purposes. The module may also generate codes by retrieving them from a simple list stored on the device, such as in an encrypted format. The list can be updated or reset periodically by the enabler.

Figure 4:
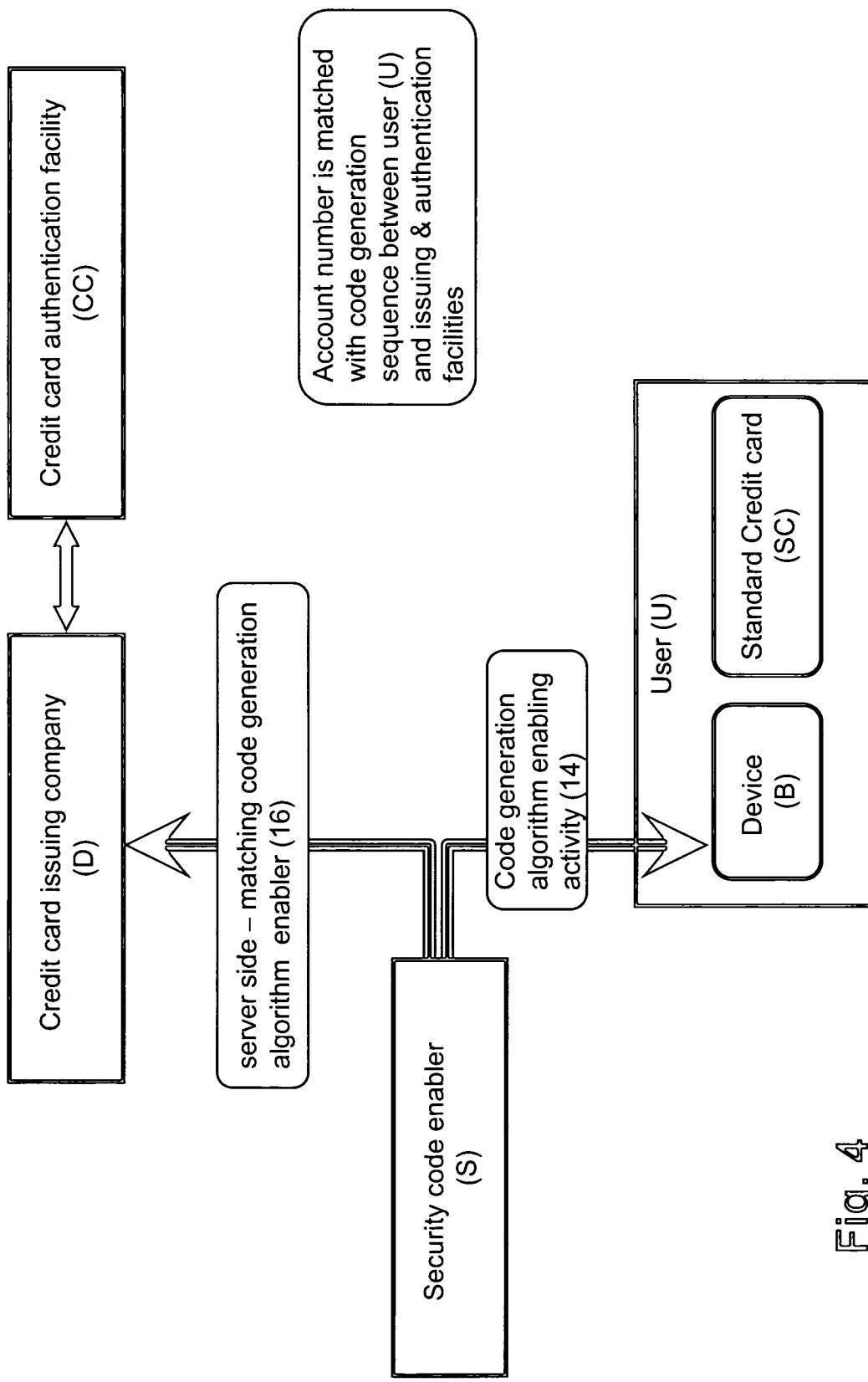
FIG. 4 is a block diagram showing an illustrative code synchronization method according to the invention.

Referring to FIG. 4, the enabler (S) can provide confirmation and matching enabling code information (15) to the credit card issuing company (D) so that the credit card company can access the same codes that the user can access. The information provided by the code enabler is specific to each user account. The code enabler can belong to the credit card issuing company or it can be operated by a separate organization.

The various parts of the system, such as the enabler and authentication equipment, can be implemented using one or more general-purpose processors programmed with special-purpose software, dedicated special-purpose hardware, or a combination of both.

In an illustrative sequence of transactions listed in table 1, the user begins by presenting his or her credit card to a merchant for a retail purchase. He or she also generates a transaction-specific code (639) in his or her portable device and relays it to the merchant. The merchant can then transmit the card information and the code to an authorization center, such as by telephone. The authorization center then determines whether the code is the correct code for the current transaction. If so, it relays an approval signal back to the merchant. If the transaction-specific code accessed at the authorization center does not match the transaction-specific code presented to the merchant, a failure to authorize signal is returned to the merchant.

When the user later enters into his or her next transaction, such as an on-line purchase of downloaded software, his or her portable device accesses another code (804). This same new code is also accessed at the authorization center so that it can be matched in a second authorization step. The process can then be repeated for further transactions of different types. In one embodiment, the matching process for a each transaction can operate on a range of adjacent codes (e.g., 639, 804, and 014), so that delays in authorizing one transaction do not cause a number of later transactions to be out-of-sync.

TABLE 1

| Transaction Code | Transaction Type |
| --- | --- |
| 639 | Retail purchase of goods |
| 804 | On-line purchase of downloaded software |
| 014 | Payment for meal at restaurant |
| 387 | Telephone purchase of goods |
| 211 | Automotive self-service fuel purchase |
| 964 | On-line bill payment |

The code is preferably short so that it can also be easily used over the phone or over a public computer network, such as the internet. To this end it should preferably be seven or fewer characters in length or even four or fewer characters in length. Each code may also take different forms depending on how it is used. Codes might be displayed to a user as an alphanumeric sequence, for example, but be encrypted when they are wirelessly transmitted.

The present invention has now been described in connection with a number of specific embodiments thereof. However, numerous modifications which are contemplated as falling within the scope of the present invention should now be apparent to those skilled in the art. It is therefore intended that the scope of the present invention be limited only by the scope of the claims appended hereto. In addition, the order of presentation of the claims should not be construed to limit the scope of any particular term in the claims.

What is claimed is:

1. A banking transaction processing method comprising:
accessing at a merchant location, a first stored authorization code from a first device carried by a person and presented to the merchant location,
electronically accessing at the merchant location, a second stored authorization code from a second device, physically separate from the first device, and separately carried by the person and presented to the merchant location,
electronically providing the first authorization code to an authorization module residing at the merchant location,
electronically providing the second authorization code to the authorization module residing at the merchant location,
electronically evaluating a relationship between the first and second authorization codes, and providing a transaction authorization indication from the authorization module for a transaction with the merchant based on a result of the step of evaluating, wherein the step of accessing a second stored authorization code is performed by electronically accessing a first of a series of transaction-specific validation code sequences from a portable electronic device carried by the person to the merchant location, and further including the steps of reissuing the first authorization code and reinitializing the series of transaction-specific validation code sequences on the portable electronic device, wherein said reissued authorization code and reinitialized series of transaction-specific validation code sequences are operable to be re-used for future instances of the merchant transactions, and completing the transaction between the merchant and the person in response to the transaction authorization indication being positive.

2. The method of claim 1 wherein the first device is a payment card, wherein the second device is a portable electronic device, wherein the steps of accessing and providing a first authorization code are performed by interaction with a magnetic recording area on the payment card and wherein the step of accessing a second stored authorization code is performed by accessing a first of a series of transaction-specific validation code sequences from the portable electronic device.

3. The method of claim 2 further including the steps of providing the first stored authorization code to a further transaction authorization module for a further merchant, and providing a second of the series of transaction-specific validation code sequences to the further transaction authorization module for the further merchant.

4. The method of claim 3 wherein the step of providing the first stored authorization code to the further transaction authorization module and the step of providing a second of the series of transaction-specific validation code sequences to the further transaction authorization module are performed through a communication channel.

5. The method of claim 4 wherein the step of providing the first stored authorization code to the further transaction authorization module and the step of providing a second of the series of transaction-specific validation code sequences to the further transaction authorization module are performed through a telephonic voice line.

6. The method of claim 4 wherein the step of providing the first stored authorization code to the further transaction authorization module and the step of providing a second of the series of transaction-specific validation code sequences to the further transaction authorization module are performed through a public computer network.

7. The method of claim 1 further including the steps of providing the first stored authorization code to a further transaction authorization module for a further merchant through a communication channel, and providing a second of the series of transaction-specific validation code sequences to the further transaction authorization module communication channel for the further merchant.

8. The method of claim 1 wherein the step of accessing a second authorization code accesses an alphanumerical code that is equal to or less than about seven characters in length.

9. The method of claim 1 wherein the step of accessing a second authorization code accesses an alphanumerical code that is equal to or less than about four characters in length.

10. The method of claim 1 further including a step of generating the second authorization code locally in a portable electronic device.

11. The method of claim 10 further including a step of providing generation logic that performs the local authorization code generation to the portable device through a communication channel.

12. The method of claim 1 further including a step of transmitting the second authorization code to the portable electronic device before the step of accessing the second authorization code.

13. The method of claim 1 wherein the step of evaluating evaluates whether the second authorization code corresponds to a specific stored transaction-specific validation code sequence for a particular transaction conducted in connection with the first authorization code.

14. The method of claim 1 wherein the steps of providing a first authorization code and providing a second authorization code are both performed independently of any user data entry.

15. The method of claim 1 wherein the step of providing a second authorization code is performed with a keypad or keyboard.

16. The method of claim 1 wherein the steps of accessing and providing a first authorization code are performed by accessing a magnetically stored account number on a credit card using a unitary retailer-based authorization module, wherein the step of accessing a second stored authorization code is performed by accessing a first of a series of transaction-specific validation code sequences of about seven alphanumeric characters or less from a portable electronic device and the step of providing the second authorization code is performed using a keypad on the unitary retailer-based authorization module, and wherein the method further includes the steps of providing a version of the first stored authorization code to a further transaction authorization module via a telephonic voice line, and providing a second of the series of transaction-specific validation code sequences to the further transaction authorization module via a telephonic voice line.

17. A banking transaction processing method comprising:
    accessing through a first device at a merchant location, a first stored authorization code from a first device carried by a person and presented to the merchant location,
    electronically accessing through a second device at the merchant location, a second stored authorization code from a second device, physically separate from the first device, and separately carried by the person and presented to the merchant location,
    electronically providing the first authorization code to an authorization module residing at the merchant location,
    electronically providing the second authorization code to the authorization module residing at the merchant location,
    electronically evaluating a relationship between the first and second authorization codes, and providing a transaction authorization indication from the authorization module for a transaction with the merchant based on a result of the step of evaluating, wherein the step of accessing a second stored authorization code is performed by electronically accessing a first of a series of transaction-specific validation code sequences from a portable electronic device carried by the person to the merchant location,
    and further including the step of reinitializing the series of transaction-specific validation code sequences on the portable electronic device, wherein said reissued authorization code and reinitialized series of transaction-specific validation code sequences are operable to be re-used for future instances of the merchant transactions, and completing the transaction between the merchant and the person in response to the transaction authorization indication being positive.

18. The method of claim 17 wherein the first device is a payment card, wherein the second device is a portable electronic device, wherein the steps of accessing and providing a first authorization code are performed by interaction with a magnetic recording area on the payment card and wherein the step of accessing a second stored authorization code is performed by accessing a first of a series of transaction-specific validation code sequences from the portable electronic device.

19. The method of claim 18 further including the steps of providing the first stored authorization code to a further transaction authorization module for a further merchant, and providing a second of the series of transaction-specific validation code sequences to the further transaction authorization module for the further merchant.

20. The method of claim 19 wherein the step of providing the first stored authorization code to the further transaction authorization module and the step of providing a second of the series of transaction-specific validation code sequences to the further transaction authorization module are performed through a communication channel.

21. The method of claim 20 wherein the step of providing the first stored authorization code to the further transaction authorization module and the step of providing a second of the series of transaction-specific validation code sequences to the further transaction authorization module are performed through a telephonic voice line.

22. The method of claim 20 wherein the step of providing the first stored authorization code to the further transaction authorization module and the step of providing a second of the series of transaction-specific validation code sequences to the further transaction authorization module are performed through a public computer network.

23. The method of claim 17 further including the steps of providing the first stored authorization code to a further transaction authorization module for a further merchant through a communication channel, and providing a second of the series of transaction-specific validation code sequences to the further transaction authorization module communication channel for the further merchant.

24. The method of claim 17 wherein the step of accessing a second authorization code accesses an alphanumerical code that is equal to or less than about seven characters in length.

25. The method of claim 17 wherein the step of accessing a second authorization code accesses an alphanumerical code that is equal to or less than about four characters in length.

26. The method of claim 17 further including a step of generating the second authorization code locally in the portable electronic device.

27. The method of claim 17 further including a step of providing generation logic that performs the local authorization code generation to the portable device through a communication channel.

28. The method of claim 17 further including a step of transmitting the second authorization code to a portable electronic device before the step of accessing the second authorization code.

29. The method of claim 17 wherein the step of evaluating evaluates whether the second authorization code corresponds to a specific stored transaction-specific validation code sequence for a particular transaction conducted in connection with the first authorization code.

30. The method of claim 17 wherein the steps of providing a first authorization code and providing a second authorization code are both performed independently of any user data entry.

31. The method of claim 17 wherein the step of providing a second authorization code is performed with a keypad or keyboard.

* * * * *